Nov. 13, 1962 F. H. COLE 3,064,226
VIBRATION RESISTANT CONNECTOR
Filed Sept. 28, 1959
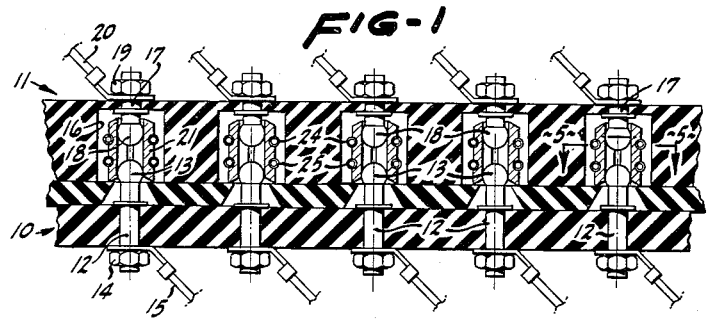
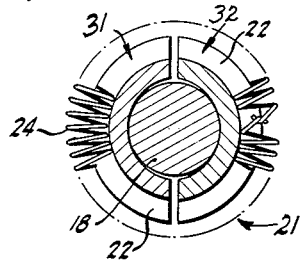
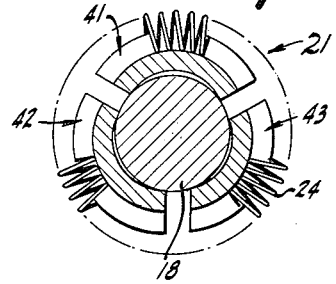
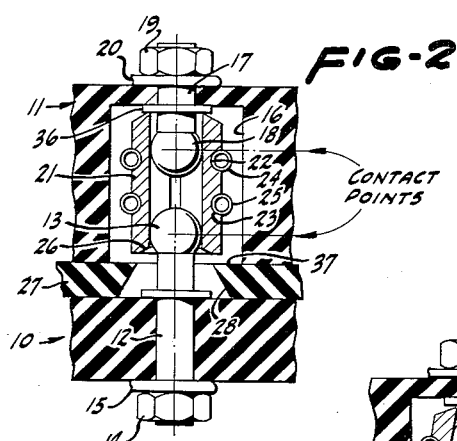
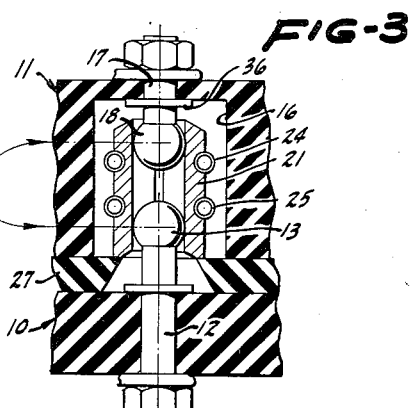
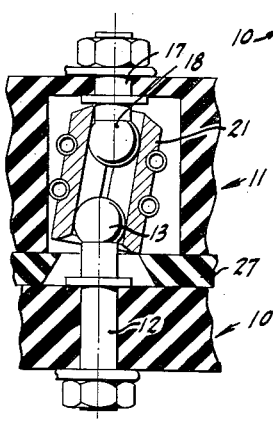
INVENTOR.
FRED H. COLE
BY
Mellin and Hanscom
ATTORNEYS United States Patent Office 3,064,226
Patented Nov. 13, 1962

3,064,226
VIBRATION RESISTANT CONNECTOR
Fred H. Cole, 1028 S. Sierra Bonita, Los Angeles 19, Calif.
Filed Sept. 28, 1959, Ser. No. 842,650
2 Claims. (Cl. 339—64)

This invention relates to electrical connectors, and more particularly to multiple connectors capable of being subjected to very high vibrational and shock forces without failure, either complete failure wherein the contacts come open and interrupt the circuit through the connector, or partial failure wherein an undue change in contact resistance may occur.

The particular connector illustrated and described below has been designed specifically to meet the rigorous operating conditions encountered in rocket launchings, although the connector can be readily used in other environments in which it may be subjected to severe vibrational or shock forces.

The present connector was developed to be used in the control circuits physically linking a rocket or missile to a ground station. In general, these control circuits are used to indicate to the ground station the exact internal functioning of the rocket during the build up of the rocket engine and are used to control the release of the rocket at the proper moment. As the rocket is released from the launching pad, the connector is disconnected. In building up the forces necessary for launching, the securely fastened rocket is subjected to extremely high vibrational forces which, of course, are imposed upon the connector linking the missile to the ground station. Many of the control signals in the connector circuits are of low level, and it is essential that no undue extraneous electrical noise be introduced into these circuits by the vibration of the connector for then the signal sensing apparatus will respond falsely to the actual internal rocket conditions and may cause the rocket launching to fail.

The most obvious example of connector failure would be for a control circuit to be broken by the complete physical separation of the contacting surfaces due to vibrational, shock or other mechanical forces. However, failure may also result if the contacts separate merely sufficiently to cause an arc between the contacting surfaces. In a sense the circuit is still complete, but the arc will introduce so much noise in the circuit as to cause circuit failure.

In addition, electrical noise can be generated in a connector by merely varying the contact pressure, even though the circuit remains closed at all times. The contact resistance in the connector is a function of the contact pressure, and thus variations in contact pressure will cause variations in the electrical parameters of the circuit resulting in the generation of undesirable noise and malfunctioning of the circuit.

To be successful in the above conditions, the electrical connectors of the present invention have been dedesigned to operate without failure even though subjected to vibrational forces in the order of 40 g's at frequencies from 50–2000 cycles per second, and to shock forces at least in the order of 50 g's.

A further problem encountered in the design of the present invention is that the connector has to make a great number of high current capacity circuits, which would require a larger total contact pressure. Operating requirements dictate that the connections be easily made manually and that very little force be used to disconnect the connector when so desired.

These latter requirements resulted in a multiple connector having a plurality of pairs of matable contacts embraced by a resilient sleeve. One operating model of such a connector completes 109 circuits, each rated at 50 amperes, and requires only 50 pounds pressure to make.

A variety of connectors can be made using the principle of two spherical contacts embraced by a resilient sleeve, but it has been found that although the connectors may perform well statically, practically all of the connectors fail when subjected to severe dynamic mechanical stresses. For example, a sleeve having a plurality of lengthwise slits extending alternately from the ends to just short of the opposite end operates very successfully statically. However, when subjected to a vibrational force at the resonant frequency of the sleeve, it will vibrate in a manner similar to a tuning fork and will chatter against the contact heads. From this, it develops that the longitudinal segments of the sleeve must be physically separated from one another, and that some biasing means must be used to press the sleeve segments against the contact heads to give the desired contact pressure. Other illustrative considerations will be discussed in connection with the embodiment of the present invention.

From the above, the primary object of the invention is to provide an electrical connector which is highly resistant to circuit failure when subjected to severe mechanical shock and vibration forces.

Another object is the provision of a self-aligning connector having two terminal heads embraced by a segmented sleeve and arranged to resist mechanical failure due to vibrational forces imposed thereon.

A further object is to provide a connector as set forth in the last object in which the segments are physically separated from one another and are held in contact with the terminal heads by means of coil springs disposed peripherally around the sleeve and arranged so that the springs will always be between the points of contact between the sleeve and the terminals regardless of longitudinal movement of the sleeve relative to the terminal head.

A still further object is to provide a connector as above in which the internal radii of the sleeve segments differ from the radii of the terminal heads to increase the specific contact pressure therebetween.

Other objects and advantages will become apparent in the course of the following detailed description.

In the drawings forming a part of this application, and in which like parts are designated by like reference numerals throughout the same, FIG. 1 is a sectional view of a portion of a plug and receptacle constructed in accordance with the invention, illustrating five sets of mating contacts.

FIGS. 2 and 3 are enlarged sectional views of one set of contacts of FIG. 1, and illustrate the position of the elements at extreme longitudinal positions of the sleeve relative to the contact heads.

FIG. 4 is similar to FIGS. 2 and 3 and illustrates the position of the elements when the contact heads are shifted laterally relative to one another.

FIG. 5 is a sectional detail taken on line 5—5 of FIG. 1.

FIG. 6 is a view similar to FIG. 5, illustrating a modification of the invention.

Referring now to the drawings, the electrical connector illustrated comprises a plug 10 and receptacle 11, both formed from electrically non-conductive material. A plurality of electrical terminal pins 12 extend through the plug 10, and are each provided with an enlarged spherical head 13 thereon. Nuts 14 secure lead wires 15 to the terminal pins.

The receptacle 11 is provided with a plurality of recesses 16 therein, with the recesses being spaced apart from one another complementary to the spacing between terminal pins 12. An electrtical terminal 17 extends through receptacle 11 into each recess. The terminals 17 are also provided with enlarged spherical heads 18 thereon of a diameter equal to that of heads 13. Nuts 19 secure leads 20 to terminal 17.

An electrically-conductive, longitudinally-segmented terminal contact sleeve 21 is disposed in each recess, with one end of the sleeve embracing the spherical terminal head 18. The outer surface of the sleeve has two peripheral grooves 22 and 23 formed therein to retain the two garter or coil springs 24 and 25. These springs are disposed with their axes extending around sleeve 21 and exert a peripheral compressive force on the sleeve so that a desired contact pressure is exerted between the sleeve segments and the terminal head 18. The lower end of the sleeve 21 is internally chamfered at 26 to facilitate the entry of the spherical terminal head 13 into the sleeve.

The sleeve is held within recess 16 by base plate 27 which is rigidly secured to the receptacle body 11 by any suitable means (not shown). Apertures 28, formed through the base plate to provide access to recesses 16, are tapered outwardly from the recess to provide a guide means for guiding the pins 12 into the recesses. The smallest diameter of the apertures is slightly less than the outside diameter of sleeve 21 (when the head 13 is not inserted therein) in order to hold the sleeve captive within the recess. Also, the smallest diameter of apertures 28 is appreciably greater than the diameter of head 13 so as to accommodate misalignment of pins 12.

As best seen in FIGS. 2 and 5, the sleeve 21 comprises two separate identical longitudinal segments 31 and 32, held together by the springs 24 and 25. Although the segments can be machined in any conventional manner, their shape can best be described as if the segments are formed from a right circular cylinder whose internal radius differs from the radii of the terminal heads 13 or 18. In FIG. 5, the internal radius of the segments 31 and 32 is greater than the radius of head 18. The significance of these different radii will be seen in the following discussion.

As has been stated, it is extremely desirable to maintain as constant and as low a value of contact resistance as possible in order not to disturb the control signals passing through the contacts. Contact resistance is determined primarily by the material found at the contacting surfaces and the inevitable oxide coating of the contacting surfaces will have a contact resistance which is much greater than the value which would be obtained wtih clean contacts.

As is also well known, contact resistance varies as an inverse function of the contact pressure, with the contact resistance decreasing with an increase in contact pressure, and vice versa.

From the above considerations, the sleeve segments 31 and 32 are made with internal radii different from that of the spherical terminals 13 and 18 so that only a point contact is made therebetween, in order to provide a high specific contact pressure at the contact points. The high specific pressure crushes the surface oxides and lowers the contact resistance. As will be appreciated, if the contact area is increased, as when the sleeve segments have internal radii equal to the terminals 13 and 18, the specific contact pressure will decrease, with a much poorer connection being made through the surface oxides.

In addition, the greater the specific contact pressure, the more unifrom will be the contact resistance in spite of vibrational shifting of the sleeve 21 relative to the terminals. Under random vibration, the sleeve will move randomly on the terminals, with the surface oxide being crushed and scraped away to some extent during the movement. As a clean surface is exposed, it will start to oxidize. With random movement, there will be random amounts of oxidation on the contacting surfaces such that the contact resistance would vary considerably from point to point if the contact pressure were low. However, with a high specific pressure, the surface oxide will be sufficiently crushed, in spite of variations in oxidation, such that the contact resistance will be relatively uniform in spite of random relative movement between the sleeve and the terminals.

FIG. 6 illustrates a modification of the sleeve 21 in which three segments, 41, 42 and 43 are used. In this case, the segments each have an internal radius which is less than the radii of the terminals 13 and 18. This again causes a high specific contact pressure between the contacting portions of the sleeve segments and terminals, in order to obtain the best electrical contact between the sleeve and terminals as discussed above.

As may be apparent, the number of sleeve segments is not limited to two, but may be more, and the internal radii of the segments can be greater or smaller than the radii of the terminal heads.

Turning now to the vibrational aspects of the invention, it should again be noted that the connector should be able to withstand vibrational forces in excess of 40 g's. At these forces, the effect of the mass of the parts becomes a very important factor even though the parts are relatively small and light in weight. In particular, springs are very troublesome since they may be set into oscillatory motion if subjected to strong vibrational forces at the natural frequency of the springs.

It has been discovered that the optimal spring arrangement for use in the present invention is that shown, wherein coil springs are disposed around the periphery of the sleeve. Since the axis of the coil is non-linear, then there is little chance that the coil will oscillate in the direction of its axis. Also the frictional engagement of each turn of the coil with the walls of the grooves 22 and 23 will damp out any such resonant oscillation. The coil springs illustrated will produce the most constant contact pressure between the sleeve segments and terminal heads.

It is important that the sleeve segments be able to move freely longitudinally of the axis of the sleeve, as illustrated in FIGS. 2 and 3, and that the sleeve be able to rotate on the terminal heads shown in FIG. 4. If the sleeve is not free for such movement, there is likelihood that the sleeve segments may be spread apart due to movement of the terminal heads relative to one another. Such spreading will increase the spring tension and will increase the contact pressure, in turn causing the contact resistance to vary.

It has been found that the connector will fail under vibration unless the two springs are situated in such manner as to always exert a positive force on each terminal head. This is best illustrated in FIGS. 2 and 3 which indicate the extremes in longitudinal movement of the sleeve 21 relative to the terminal heads 13 and 18. The flange 36 on terminal 17 and the face 37 of base plate 27 serve as stop members fixed relative to terminal head 18 which are engageable with the ends of the sleeve 21 to limit the free longitudinal movement thereof between the extreme positions shown in FIGS. 2 and 3. It will be noted that in each case, both springs are between the two points of contact between a sleeve segment and the terminal heads, and thus each spring exerts a positive force on each terminal. If the sleeve could so move so that the centerline of the spring passes beyond the points of contact between the terminals and the sleeve, then there would be one spring on each side of a terminal head—one inside the contact points, and one outside the contact points. The inside spring will exert a positive force holding the sleeve in contact with both terminals, but the outside spring will only exert a positive force on one terminal, tending to pivot the sleeve out of contact with the other terminal. Due to manufacturing tolerances, no two springs will have exactly the same characteristics, and the outside spring can overcome the force of the inside spring to cause chattering if subjected to a particular frequency and force. This effect is avoided in the present invention because both springs exert positive forces on both terminals at all times.

It has been found that two springs will produce better results than one, because the forces on each terminal will be more uniform. In addition, if one spring is subjected to a force which would tend to open the connection, the other spring will maintain the connection due to the positive force on each terminal by a single spring.

From the above it can be seen that an electrical connector has been devised which is highly resistant to failure from shock and vibration, and in which the contact resistance is held at a low and relatively constant value in spite of shock and vibration.

It is to be understood that the invention herein shown and described are preferred embodiments of the same, and that changes may be made in the shape, size and arrangement of parts without departing from the spirit of the invention as described or from the scope of the attached claims.

Having thus described my invention, what I claim and desire to secure by Letters Patent is:

1. A vibration resistant connector comprising first and second electrical terminals to be connected, said terminals having substantially equal diameter spherical heads thereon, an electrically conductive sleeve having an inner surface of substantially uniform configuration embracing and contacting said heads, means for maintaining said heads in mutually spaced relation within said sleeve, said sleeve being freely slidable longitudinally on said heads and movable laterally to accommodate misalignment of said terminals and comprising at least two longitudinal segments separated from one another, a pair of coil springs disposed peripherally around said sleeve between the ends thereof and intermediate its most proximate points of contact with the respective heads for exerting a peripherally compressive force on said sleeve, said springs being disposed in spaced relationship longitudinally of said sleeve with their axes extending around said sleeve, stop means fixed relative to one of said heads and engageable with the ends of said sleeve for restricting movement of said sleeve to positions in which both of said springs lie completely between the points of contact of said heads with said sleeve.

2. A vibration resistant connector according to claim 1 wherein the inner surfaces of said segments have radii differing from the radii of said heads.

References Cited in the file of this patent

UNITED STATES PATENTS

| | | |
|---|---|---|
| 2,086,424 | Koehler | July 6, 1937 |
| 2,123,631 | Koehler | July 12, 1938 |
| 2,176,718 | Linde | Oct. 17, 1939 |
| 2,243,567 | Linde | May 27, 1941 |
| 2,331,255 | West | Oct. 5, 1943 |
| 2,356,752 | Deysher | Aug. 29, 1944 |
| 2,427,182 | Bergan | Sept. 9, 1947 |
| 2,658,183 | Klostermann et al. | Nov. 3, 1953 |
| 2,695,390 | Woolston et al. | Nov. 23, 1954 |
| 2,809,362 | Powell | Oct. 8, 1957 |